United States Patent [19]

Giallorenzi

[11] 3,743,383

[45] July 3, 1973

[54] HIGH POWER BEAM COMBINER

[75] Inventor: Thomas G. Giallorenzi, Alexandria, Va.

[73] Assignee: The United States of America as represented by the Secretary of the Navy, Washington, D.C.

[22] Filed: Mar. 23, 1972

[21] Appl. No.: 237,427

[52] U.S. Cl. .................. 350/170, 350/170, 350/174, 350/286
[51] Int. Cl. ........................................... G02b 27/12
[58] Field of Search .................. 350/170, 174, 286; 331/94.5 C

[56] References Cited
UNITED STATES PATENTS 3,577,093   5/1971   Simpson ........................ 331/94.5 C Primary Examiner—David H. Rubin
Attorney—R. S. Sciascia, Arthur L. Branning et al.

[57] ABSTRACT

This disclosure is directed to a system of prisms so arranged and related to each other that one may form a collinear composite output laser beam by superimposing several laser beams of the same polarization but with different frequencies.

3 Claims, 1 Drawing Figure

PATENTED JUL 3 1973          3,743,383
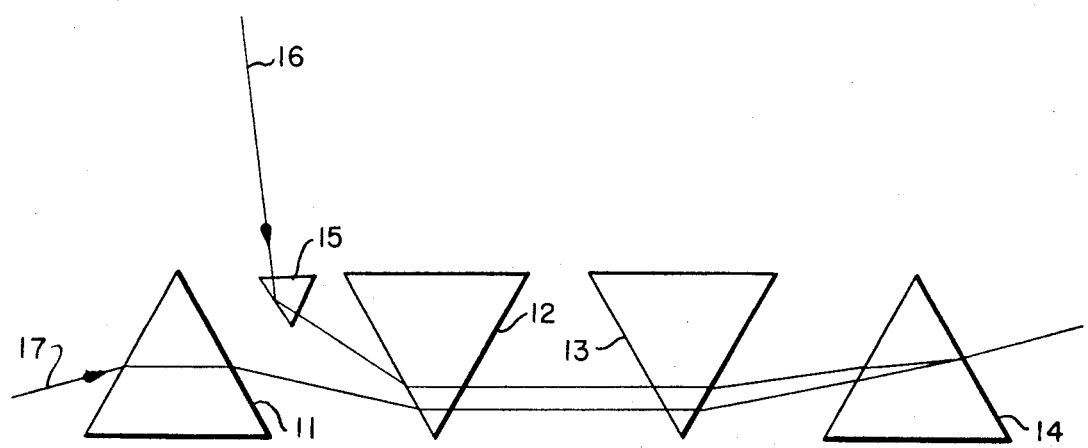

HIGH POWER BEAM COMBINER

BACKGROUND OF THE INVENTION

This invention relates to means for combining laser beams and more particularly to a system for superimposing several laser beams of different frequencies to form a single high power beam.

Previous methods to make two beams collinear included beam splitters and mirrors which are coated to transmit one wavelength and reflect the second wavelength. These beam splitters and mirros are employed at 45° relative to the incident beam. These types of beam splitters are limited by the optical coating which has to be applied to mirror substrates to obtain the desired transmission-reflection characteristics. Also, at high laser powers, this coating may be damaged by the intense light field.

A similar system has been set forth in U.S. Pat. No. 3,577,093 which produces a single beam containing a plurality of parallel beams which are not superimposed onto each other.

SUMMARY OF THE INVENTION

This invention makes use of a plurality of prisms so arranged and related to each other that a plurality of different laser beams may be directed through the system resulting in a single output beam containing the plurality of beams superimposed upon each other collinearly.

STATEMENT OF THE OBJECTS

It is therefore an object of the present invention to provide a system for combining a plurality of laser beams into a single beam.

Another object is to provide an optical system which is capable of long use with high radiation densities.

Still another object is to provide an optical system which permits one to vary the frequency of a single laser input of a composite beam output without changing the relative positions of the optical elements and of the output laser beams.

Yet another object is to provide an optical system for use with a plurality of laser outputs which does not depend upon optical coatings which may be damaged by high power laser radiation.

Other objects and advantages of the system will be obvious from the following specification when considered with the drawing.

BRIEF DESCRIPTION OF THE DRAWING

The drawing illustrates the optical elements and their relationship.

DESCRIPTION OF THE DRAWING

Now referring to the drawing there is shown by illustration a plurality of optically aligned prisms which are constructed and positioned such that a plurality of laser output radiation beams may be directed through the system and emerge from the system collinear and superimposed. The system includes four 60° isosceles prisms 11–14 in linear alignment with the end prisms 11 and 14 positioned with their base at the bottom and the central two prisms 12 and 13 with their vertex end at the bottom. Therefore, the tip of the vertex ends of prisms 12 and 13 are on the same line as the base of each of the prisms 11 and 14. As such, the base of prisms 11 and 14 are on a line which is parallel to a line along the base of prisms 12 and 13. Thus, the adjacent faces of prisms 11 and 12, and 13 and 14 are parallel with each other. Therefore, prisms 13 and 14 are mirror images of prisms 11 and 12. A totally internally reflecting prism is positioned between prisms 11 and 12 such that radiation incident on one side is totally reflected from the opposite side toward the adjacent face of the adjacent prism 12. The distance between the prisms 12 and 13 is not critical and prism 15 is positioned such that the totally reflected light beam 16 that passes through prism 15 intersects prism 12 at a position along the face thereof and at an angle such that the beam 16 is collinear with beam 17 that passes through the 60° prisms and is superimposed on beam 17 upon emerging from the prism 14. The positioning of prism 15 is dependent on the dispersion of prisms 11–14 the distance between the 60° prisms. Once prism 15 has been properly positioned relative to prism 12 for the desired output from prism 14, the frequency of beam 17 may be varied without effecting the alignment of any of the prisms. Thus, the system is useful in making a tunable output of a dye laser or parametric oscillator collinear and superimposed on a second laser beam directed through prism 15.

In aligning the system such that two different beams may be made to emerge from the system collinear and superimposed, the 60° prisms 11–14 are aligned first. The prisms 11–14 are optically aligned in the same plane such that the bases of prisms 11 and 14 are on the same line and the bases of prisms 12 and 13 are on the same line. In this position the vertex of prisms 11 and 14 are even with the bases of prisms 12 and 13 and the vertex ends of prisms 12 and 13 are even with the bases of prisms 11 and 14. Thus, adjacent sides of prisms 11 and 12 will be parallel with each other and the adjacent sides of prisms 13 and 14 will be parallel with each other. Since prisms 13 and 14 are mirror images of prisms 11 and 12, the spacing between prisms 13 and 14 will equal the spacing between prisms 11 and 12. As set forth previously, the spacing between prisms 12 and 13 is not critical. Once the four 60 degree prisms have been properly positioned the totally reflecting prisms is positioned between prisms 11 and 12 such that radiation 16 incident on one face will be fully reflected by the base out through the other face onto the adjacent face of prism 12, through prisms 12 and 13 and out through prism 14. In passing through the prisms the path of the radiation will be deviated in accordance with the incident angle and the index of refraction of the prism. Since the index of refraction will remain the same then the path of radiation passing therethrough will depend on the angle of incidence and position along the length of the face upon which the radiation is incident.

In order to make the two beams collinear and superimposed, the first beam 17 is directed through the prisms to produce an output beam from prism 14. The position and alignment of the beam may be determined, then the beam 17 may be extinguished and the beam 16 incident on prism 15 is directed through the system. The prism 15 is adjusted for position and angular setting with respect to prism 12 such that the radiation will be incident on the face of prism 12 at the correct angle and correct position in order for the beam to emerge from prism 14 along the same path as beam 17. Thus, the prism 15 is mounted for vertical movement to provide the proper adjustment. A detector may be used in insuring that the output of the two beams are collinear and superimposed.

Since the prisms need not be optically coated, radiation of different frequencies may pass through the prisms with little if any effect on the beam. Also, high power beams may be used over prolonged periods of time without damage to the prisms. Therefore, the system permits one to tune the output and mix radiation of different frequencies. Such a system is simple in structure and has long life.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. An optical system for combining at least two separate laser outputs to provide a single output in which the separate beams are collinear and superimposed upon each other which; comprises,
    a plurality of identical isosceles prisms in optical alignment and spaced from each other,
    a portion of said prisms mounted with their base down with the remainder mounted with their base up with the up and down bases being in parallel planes,
    a separate totally reflecting prism mounted between the first and second prisms of said plurality of identical prisms,
    said separate totally reflecting prism being positioned such that incident light will be totally internally reflected onto its adjacent prism then through the remainder of said prisms with the output thereof emerging at a point collinear and superimposed on the output of a radiation beam incident on the first identical prism and passing optically through the remainder of said identical prisms and emerging at the same point.

2. A system as claimed in claim 1; wherein,
    said plurality of identical isosceles prisms are four 60° prisms with the first and second 60° prism mounted with their bases reversed and the third and fourth 60° prisms are mirror images of said first and second 60° prisms.

3. A system as claimed in claim 2; wherein,
    said separate totally reflecting prism is a 45°–45°–90° prism positioned with its base adjacent one face of the first prism.

* * * * *